(12) United States Patent
Zhang et al.

(10) Patent No.: US 12,174,914 B2
(45) Date of Patent: Dec. 24, 2024

(54) IMAGE DATA CLASSIFICATION METHOD, DEVICE AND SYSTEM

(71) Applicant: Beijing BOE Technology Development Co., Ltd., Beijing (CN)

(72) Inventors: Libo Zhang, Beijing (CN); Yuanyuan Lu, Beijing (CN); Wangqiang He, Beijing (CN); Dong Chai, Beijing (CN); Hong Wang, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 395 days.

(21) Appl. No.: 17/477,070

(22) Filed: Sep. 16, 2021

(65) Prior Publication Data

US 2022/0092359 A1  Mar. 24, 2022

(30) Foreign Application Priority Data

Sep. 21, 2020  (CN) .......................... 202010996020.4

(51) Int. Cl.
*G06T 11/00* (2006.01)
*G06F 18/10* (2023.01)
*G06F 18/21* (2023.01)
*G06F 18/214* (2023.01)
*G06F 18/24* (2023.01)
*G06T 7/00* (2017.01)

(52) U.S. Cl.
CPC ............ *G06F 18/217* (2023.01); *G06F 18/10* (2023.01); *G06F 18/214* (2023.01); *G06F 18/24* (2023.01); *G06T 7/0004* (2013.01); *G06T 2207/20081* (2013.01); *G06T 2207/20084* (2013.01)

(58) Field of Classification Search
None
See application file for complete search history.

(56) References Cited

PUBLICATIONS

Ye, Ruifang, et al. "Intelligent Defect Classification System Based on Deep Learning." Advances in Mechanical Engineering, vol. 10, No. 3, Mar. 2018, p. 168781401876668. DOI.org (Crossref), https://doi.org/10.1177/1687814018766682. (Year: 2018).*

(Continued)

*Primary Examiner* — Matthew C Bella
*Assistant Examiner* — Johnny B Duong
(74) *Attorney, Agent, or Firm* — DINSMORE & SHOHL LLP

(57) ABSTRACT

The present disclosure relates to an image data classification method, device and system, and relates to the field of computer technology. The method includes: inputting test image data into a neural network model trained by using an original training sample set for classification, and determining an image type to which the test image data belongs and a membership probability of the image data belonging to the image type; establishing an easy-to-classify data set, according to test image data with a membership probability greater than a first threshold; adding test image data in the easy-to-classify data set that has a classification accuracy rate less than or equal to a second threshold and a correct classification result to the original training sample set to generate an augmented training sample set; and using the augmented training sample set to train the neural network model so as to determine an image class.

19 Claims, 5 Drawing Sheets

(56) References Cited

PUBLICATIONS

Ferguson, Max K., et al. "Detection and Segmentation of Manufacturing Defects with Convolutional Neural Networks and Transfer Learning." Smart and Sustainable Manufacturing Systems, vol. 2, 2018, p. 10.1520/SSMS20180033. PubMed Central, https://doi.org/10.1520/SSMS20180033. (Year: 2018).*

Lin, Tsung-Yi, et al. "Focal Loss for Dense Object Detection." arXiv.Org, Aug. 7, 2017, https://arxiv.org/abs/1708.02002v2. (Year: 2018).*

Ahn, Gilseung, et al. "A Membership Probability-Based Undersampling Algorithm for Imbalanced Data." Journal of Classification, vol. 38, No. 14, Jan. 2020, pp. 2-15. Springer Link, https://doi.org/10.1007/s00357-019-09359-9. (Year: 2020).*

Lin, Tsung-Yi, et al. Focal Loss for Dense Object Detection. arXiv:1708.02002, arXiv, Feb. 7, 2018. arXiv.org, https://doi.org/10.48550/arXiv.1708.02002. (Year: 2018).*

* cited by examiner

IMAGE DATA CLASSIFICATION METHOD, DEVICE AND SYSTEM

CROSS-REFERENCE TO RELATED APPLICATIONS

The present application is based on and claims priority to China Patent Application No. 202010996020.4 filed on Sep. 21, 2020, the disclosure of which is incorporated by reference herein in its entirety.

TECHNICAL FIELD

The present disclosure relates to the field of computer technology, and in particular to an image data classification method, an image data classification device, an image data classification system, and a non-volatile computer-readable storage medium.

BACKGROUND

With the emergence of deep neural networks (DNN), the image processing technology has been greatly developed. Owing to faster speed and higher precision, deep neural networks have been more widely applied in various fields. For example, in practical applications such as medicine, remote sensing, face recognition, and automatic driving, a large number of images may be classified and processed by the image processing technology based on deep neural networks.

In related technologies, based on the classification criteria of service scenarios, training samples of various images are collected to train neural network models; images are classified by the trained neural network models.

SUMMARY

According to some embodiments of the present disclosure, an image data classification method is provided. The method comprises the steps of: inputting test image data into a neural network model trained by using an original training sample set for classification, and determining an image type to which the test image data belongs and a membership probability of the image data belonging to the image type; establishing an easy-to-classify data set, according to test image data with a membership probability greater than a first threshold; adding test image data in the easy-to-classify data set that has a classification accuracy rate less than or equal to a second threshold and a correct classification result to the original training sample set so as to generate an augmented training sample set; and using the augmented training sample set to train the neural network model so as to determine an image classification model.

In some embodiments, the classification method further comprises: adding test image data with a classification accuracy rate greater than the second threshold in the easy-to-classify data set to the training sample set so as to generate the augmented training sample set.

In some embodiments, the classification method further comprises: inputting the test image data into the neural network model trained by the augmented training sample set for classification; processing the augmented training sample set based on whether test image data that is incorrectly classified this time pertains to the easy-to-classify data set; and using the augmented training sample set after processing to train the neural network model again so as to update the image classification model.

In some embodiments, the classification method further comprises: using test image data that is correctly classified this time to augment the augmented training sample set again so as to train the neural network model again.

In some embodiments, the step of inputting each of the test image data into the neural network model trained by the augmented training sample set for classification comprises: inputting a first data set and a second data set of the test image data into the neural network model trained by the augmented training sample set for classification, wherein the first data set comprises test image data in the easy-to-classify data set that has a classification accuracy rate less than or equal to the second threshold and an incorrect classification result, and the second data set comprises test image data in a difficult-to-classify data set, wherein the difficult-to-classify data set is determined based on an image type to which test image data with a membership probability less than or equal to the first threshold belongs.

In some embodiments, the step of processing the augmented training sample set based on whether the test image data that is incorrectly classified this time pertains to the easy-to-classify data set comprises: determining an incorrectly marked samples required to be filtered in the augmented training sample set based on the test image data that is incorrectly classified in a case that the test image data that is incorrectly classified belongs to the first data set.

In some embodiments, the step of processing the augmented training sample set based on whether the test image data that is incorrectly classified this time pertains to the easy-to-classify data set comprises: obtaining sample data of an image type of the test image data that is incorrectly classified this time to augment the augmented training sample set again, in the case where the test image data that is incorrectly classified pertains to the difficult-to-classify data set, wherein the difficult-to-classify data set is determined based on an image type to which test image data with a membership probability less than or equal to the first threshold belongs.

In some embodiments, the step of obtaining sample data of an image type of the test image data that is incorrectly classified this time to augment the augmented training sample set again comprises: performing data enhancement processing on the test image data that is incorrectly classified this time, obtaining the sample data of the image type of the test image data that is incorrectly classified this time, and augmenting the augmented training sample set again.

In some embodiments, the classification method further comprises: calculating a classification accuracy rate of the neural network model trained again by using the augmented training sample set after processing; repeating at least one of the following steps until the classification accuracy rate of the neural network model is greater than the third threshold in a case where the classification accuracy rate of the neural network model is less than or equal to the third threshold: augmenting test image data in the easy-to-classify data set that has a classification accuracy less than or equal to the second threshold and a correct classification result to the training sample set, and training the neural network model by using the training sample set augmented; or processing the training sample set based on whether the test image data that is incorrectly classified this time belongs to the easy-to-classify data set, and training the neural network model using the processed training sample set.

In some embodiments, the classification method further comprises: using a linear adjustment factor and an exponential adjustment factor provided for a membership probability to process a focus loss function with the membership probability as a variable, and determining an improved loss function to train the neural network mode, wherein the linear adjustment factor and the exponential adjustment factor are configured such that value of the improved loss function corresponding to the membership probability is greater than that of the focal loss function in the case where any membership probability is less than a membership probability of the intersection point of the focal loss function and the improved loss function, and the value of the improved loss function corresponding to the membership probability is less than that of the focus loss function in a case where any membership probability is greater than a membership probability of the intersection point.

In some embodiments, the improved loss function is determined according to $(1-\hat{y}+\varepsilon)^\gamma$, wherein $\hat{y}$ is the membership probability, $\varepsilon$ is the linear adjustment factor, and $\gamma$ is the exponential adjustment factor.

In some embodiments, the classification method further comprises: inputting image data into the image classification model and determining an image type to which the test image data belongs.

In some embodiments, the image data is production line image data of production industry, and the image type is a product defect type of the production line image data.

In some embodiments, the classification method further comprises: inputting image data into the image classification model and marking the image data based on a classification result.

In some embodiments, the neural network model is Visual Geometry Group Network model.

In some embodiments, the original training sample set is obtained by capturing product images during production process.

In some embodiments, the classification accuracy rate is a classification accuracy rate of an image type in the easy-to-classify data set calculated by using multiple accuracy rate detection modules.

According to yet other embodiments of the present disclosure, an image data classification system is provided. The system comprises: an image data classification device according to any one of the above-described embodiments; and an image sensor for obtaining image data.

According to still other embodiments of the present disclosure, an image data classification device is provided. The device comprises: a memory; and a processor coupled to the memory, wherein the processor is configured to implement the image data classification method according to any one of the above-described embodiments based on instructions stored in the memory. According to still other embodiments of the present disclosure, a non-volatile computer-readable storage medium is provided. The medium has a computer program stored thereon, which when executed by a processor implements the image data classification method according to any one of the above-described embodiments.

BRIEF DESCRIPTION OF THE ACCOMPANYING DRAWINGS

The accompanying drawings which constitute part of this specification, illustrate the exemplary embodiments of the present disclosure, and together with this specification, serve to explain the principles of the present disclosure.

The present disclosure may be more clearly understood from the following detailed description with reference to the accompanying drawings.

DETAILED DESCRIPTION

Figure 1:
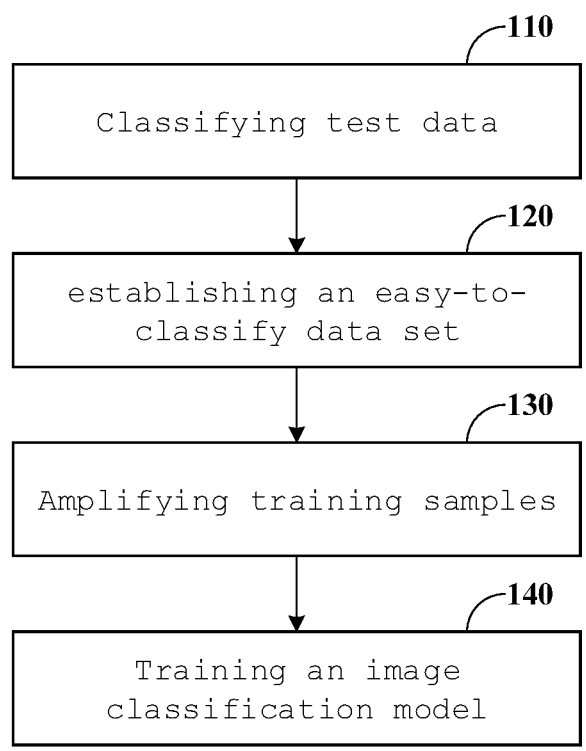
FIG. 1 shows a flowchart in some embodiments of the image data classification method according to the present disclosure.

Various exemplary embodiments of the present disclosure will now be described in detail with reference to the accompanying drawings. It should be noted that: unless additionally specified, the relative arrangements, numerical expressions and numerical values of the components and steps expounded in these examples do not limit the scope of the present disclosure.

At the same time, it should be understood that, for ease of description, the dimensions of various parts shown in the accompanying drawings are not drawn according to actual proportional relations.

The following descriptions of at least one exemplary embodiment which are in fact merely illustrative, shall by no means serve as any delimitation on the present disclosure as well as its application or use.

The techniques, methods, and apparatuses known to those of ordinary skill in the relevant art might not be discussed in detail. However, the techniques, methods, and apparatuses shall be considered as a part of the granted description where appropriate.

Among all the examples shown and discussed here, any specific value shall be construed as being merely exemplary, rather than as being restrictive. Thus, other examples in the exemplary embodiments may have different values.

It is to be noted that: similar reference signs and letters present similar items in the following accompanying drawings, and therefore, once an item is defined in one accompanying drawing, it is necessary to make further discussion on the same in the subsequent accompanying drawings.

The inventors of the present disclosure have found that the above-described related technologies are present with the following problems: since the classification criteria of various service scenarios are complicated, the samples of various image types are unevenly distributed, thereby resulting in low classification accuracy of the neural network model.

In view of this, the present disclosure provides a technical solution of image data classification, which is capable of augmenting the number of samples of image types with low classification accuracy, thereby improving the classification accuracy of the neural network.

In some embodiments, by capturing the product images during a production process (for example, a screen production process) and reviewing the product images by an engineer, it is possible to determine the type of defect and solve a damaged product in time. In this way, it is possible to control the product quality and detect a product defect, thereby improving the probability of qualified product.

In order to solve the technical problem of slow review speed caused by the huge number of product images, for example, a deep neural network model may be used to classify a large number of product images.

However, on the one hand, since the image sample data for training involves high noise, and the image types are not clearly distinguished, it is likely to cause an increased probability of misclassification of the image sample data. Moreover, some image types are similar and difficult to be distinguished, which may also cause an increased probability of misclassification of the image sample data.

In this way, it is possible to result in reduced accuracy of the image processing technology based on deep neural networks, so that it is impossible to effectively recognize the type of a product defect.

On the other hand, since the image sample data of various types is unevenly distributed, during the process of actually collecting the image sample data, it is possible that the image sample data of a certain image type is missing or in a small amount. In other words, different product defects have different probabilities of occurrence, thereby resulting in a tailed property presented in the data distribution of different image types.

Moreover, since the classification criteria in actual practices are complicated, it is likely that there are circumstances where some image types contain multiple modes. For example, "oil stain" as an image type may comprise multiple modes such as "light oil stain shaped" and "circular oil stain". In this way, it is also possible that there are circumstances where multiple modes are unevenly distributed even in the same image type.

In this way, the image sample data is unevenly distributed, which may result in that the neural network model cannot recognize part of the image types.

On the other hand, the classification data set generated after classification of the neural network model has a very large data scale, it takes a very long period to complete the data cleaning only manually, and it is impossible to effectively locate a problem present in the classification data set.

In response to the above-described technical problem, the present disclosure provides an improved solution of a loss function, so that the trained neural network model may better recognize and distinguish the image types with a small amount of sample data. In addition, a technical solution of data cleaning is provided to effectively filter out the noise data in the data set and reduce the workload of data review. Moreover, a mechanism for quickly locating the problem data is provided, which may effectively find out data in the data set that is difficult to be classified, and provide a basis for the next round of data cleaning. For example, the technical solution of the present disclosure may be realized by the following embodiments.

FIG. 1 shows a flowchart in some embodiments of the image data classification method according to the present disclosure.

As shown in FIG. 1, the method comprises: step 110 of classifying test data; step 120 of establishing an easy-to-classify data set; step 130 of augmenting training samples; and step 140 of training an image classification model.

In step 110, each test image data is input to the neural network model trained with an original training sample set for classification, so as to determine an image type to which each image data belongs and a membership probability of the image data belonging to the image type. For example, each image data is the production line image data of the production industry, and the image type is the product defect type in the production line image data. The neural network model may be a VGG (Visual Geometry Group Network) model. The test image data is unlabeled image data, which may be marked by the neural network model and the classification review processing.

For example, the data amount of the test image data is far greater than that of the original training sample set. Therefore, the test image data is classified by the neural network model so that it is possible to improve the efficiency of data labeling.

In some embodiments, the original training sample set may be obtained by capturing the product images during the production process. For example, several sample image data (for example, 300 to 500) may be screened from each image type contained in the original training sample set for training the neural network model.

In some embodiments, the neural network model may be trained by using a focal loss function. For example, the linear adjustment factor and the exponential adjustment factor provided for the membership probability may be used to process the focus loss function with the membership probability as a variable, and determine an improved loss function for training the neural network model.

The linear adjustment factor and the exponential adjustment factor are configured such that: in the case where any membership probability is less than the membership probability of an intersection point of the focal loss function and the improved loss function, the value of the improved loss function corresponding to the membership probability is greater than that of the focal loss function; in the case where any membership probability is greater than the membership probability of the intersection point, the value of the improved loss function corresponding to the membership probability is less than that of the focal loss function.

In other words, the linear adjustment factor and the exponential adjustment factor are configured such that the focus loss function has a steeper curve slope. Thus, the loss value of the loss function for data with a small membership probability (less than the membership probability of the intersection point) is increased; and the loss value for data with a large membership probability (greater than the intersection point) is reduced.

For example, the improved loss function is determined based on $(1-\hat{y}+\varepsilon)^\gamma$, where $\hat{y}$ is the membership probability, $\varepsilon$ is the linear adjustment factor (if the value is 0.15), and $\gamma$ is the exponential adjustment factor (if the value is 4). The improved focal loss function is as follows:

$$FL = \alpha(1-\hat{y}+\varepsilon)^\gamma \cdot y \log(\hat{y})$$

$\alpha$ is the balance factor (for example, the value is 0.25), which may reduce the influence caused by the uneven number distribution among the image types; y is for indicating whether the current image belongs to the current image type (for example, the value of y is 0 or 1); $\gamma$ may smoothly adjust the loss value of the image based on the classification difficulty of the current image; $\varepsilon$ may enhance the model's ability to learn difficult-to-classify data and reduce the sensitivity to the classified data.

In this way, the improved focus loss function is applied to the loss layer in the network structure, so that it is possible to reduce the loss value of easy-to-classify data and increase the loss value of difficult-to-classify data during the model training process. Therefore, the improved focus loss function allows the neural network model to have a stronger learning ability for defect data with a small number of samples and a special shape.

After the neural network model capable of classifying the images is trained, the model may be used to infer the data to be cleaned in the training sample set.

In step 120, the test image data with the membership probability greater than the first threshold is divided into the easy-to-classify data set.

In step 130, the test image data in the easy-to-classify data set which has a classification accuracy rate less than or equal to the second threshold and a correct classification result is added to the original training sample set to generate an augmented training sample set.

For example, a plurality of accuracy rate detection modules (which may be a plurality of engineers, a plurality of machine learning models, and the like) may be used to calculate the classification accuracy rate of each image type in the easy-to-classify data set; to determine whether the classification accuracy rate of the image type to which each image data in the easy-to-classify data set belongs is less than or equal to the second threshold; and to determine whether the present classification result of each image data in the easy-to-classify data set is correct by review processing.

In some embodiments, the test image data with a classification accuracy rate greater than the second threshold in the easy-to-classify data set is added to the training sample set to generate an augmented training sample set.

In the above-described embodiments, based on the classification result of each test data by the neural network model, the data belonging to the easy-to-classify image type with low classification accuracy and correct classification is screened from each test data, for augmenting the training sample. In this way, the number of samples of the image type with low classification accuracy may be augmented, thereby improving the classification accuracy of the neural network.

Figure 2:
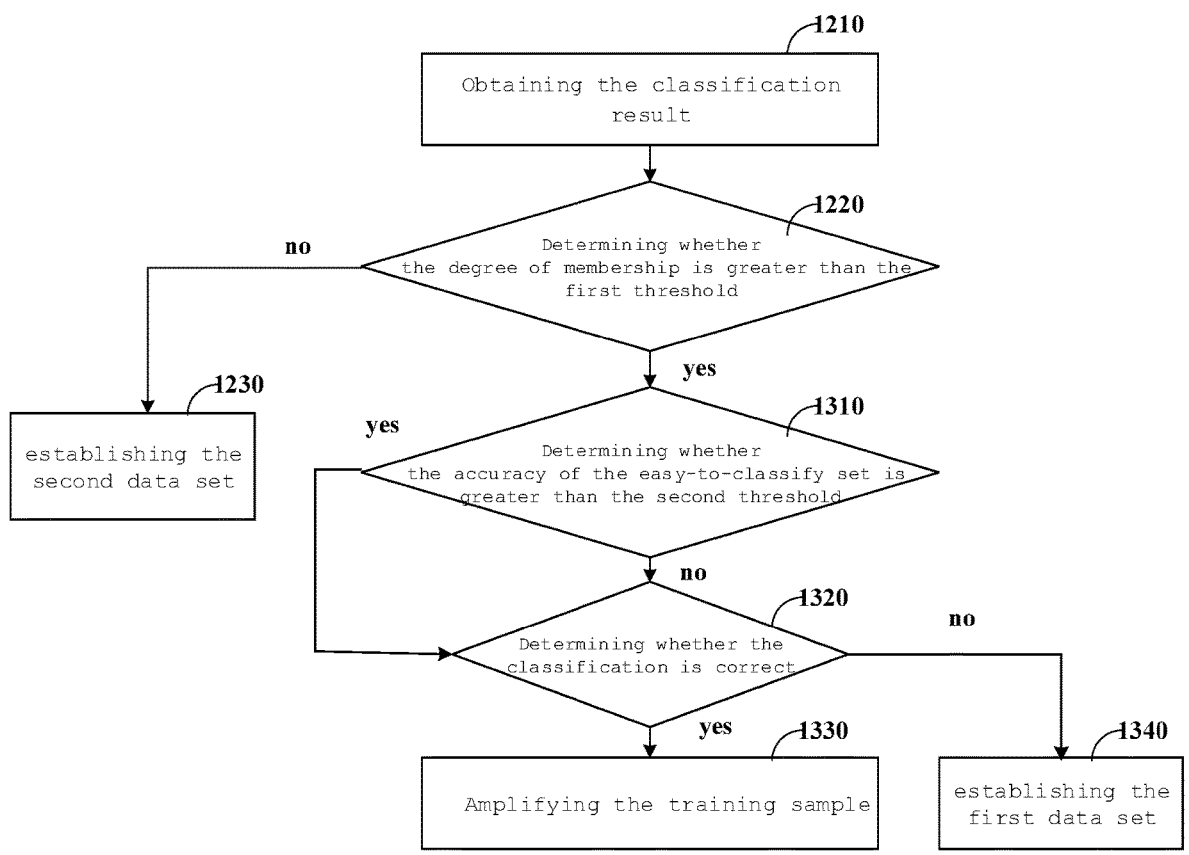
FIG. 2 shows a flowchart in some embodiments of step 120 and step 130 in FIG. 1.

In some embodiments, step 120 and step 130 may be implemented by the embodiment in FIG. 2.

FIG. 2 shows a flowchart in some embodiments of step 120 and step 130 in FIG. 1.

As shown in FIG. 2, the step 120 comprises: step 1210 of obtaining the classification result; step 1220 of determining whether the degree of membership is greater than the first threshold; and step 1230 of establishing the second data set. The step 130 comprises: step 1310 of determining whether the accuracy of the easy-to-classify set is greater than the second threshold; step 1320 of determining whether the classification is correct; step 1330 of augmenting the training sample; and step 1340 of establishing the first data set.

In step 1210, after each test image data is input into the neural network model, the image type (for example, the product defect type) of each test image data and its membership probability may be obtained.

In step 1220, it is determined whether the membership probability is greater than the first threshold. In the case where it is greater than the first threshold, step 1310 is performed; in the case where it is less than or equal to the first threshold, step 1230 is performed.

For example, if the membership probability is greater than the first threshold (for example, 0.8), it is determined that the corresponding image data passes the model test, may be favorably recognized by the model, and determined as the easy-to-classify data; if the membership probability is less than or equal to the first threshold, It is determined that the corresponding image data cannot be favorably recognized by the model, and determined as difficult-to-classify data. The membership probability is the probability that the image data belongs to the image type.

In step 1230, the corresponding image data is divided into the second data set. The second data set contains the difficult-to-classify data.

In some embodiments, the first data set comprises test image data in the easy-to-classify data set which has a classification accuracy rate less than or equal to the second threshold and an incorrect classification result. The second data set comprises test image data pertaining to the difficult-to-classify data set. The difficult-to-classify data set is determined based on the image type to which the test image data with the membership probability less than or equal to the first threshold belongs.

In step 1310, it is determined whether the classification accuracy rate of the image type corresponding to each image data in the easy-to-classify data set is greater than the second threshold. In the case where the classification accuracy rate is greater than the second threshold, step 1330 is performed; in the case where the classification accuracy rate is less than or equal to the second threshold, step 1320 is performed.

In some embodiments, the sample image data of total images is randomly selected from each image type contained in the easy-to-classify data set, and N accuracy detection modules (which may be N engineers, N machine learning models, and the like) are used to perform classification and review processing. The accuracy detection module is only configured to detect whether the classification result is correct, but not to correct the classification result involving an incorrect classification.

For example, for the class_k image type, $\text{total}_{operator\_i}$ image data is extracted and pushed to a plurality of accuracy detection modules for detection. The accuracy detection module operator_i determines whether the pushed image data is class_k, and screens out the image data that is incorrectly classified. After the screening of the image data of this type, the remaining data amount is $\text{residual}_{operatir\_i}$.

The classification accuracy of class_k judged by operator_i is:

$$\text{score}_{operator\_i} = \frac{\text{residual}_{operator\_i}}{\text{total}_{operator\_i}}$$

The average accuracy rate of all accuracy rate detection modules for this type of data is calculated as the classification accuracy rate of this type of data:

$$\text{Quality}_{class\_k} = \frac{\sum_{i=1}^{i=N} \text{score}_{operator\_i}}{N}$$

In some embodiments, the image data corresponding to the image type with a classification accuracy greater than the second threshold may be divided into a high-quality image data set, so as to augment the training samples.

In some embodiments, the image data corresponding to the image type with a classification accuracy less than the second threshold may be classified into a low-quality image data set, and determine whether to augment the image data to the training samples by further determining whether the classification of the image data is correct. For example, for an image type with a classification accuracy rate of less than 0.9, several images (for example, 1000 to 2000) may be selected from the corresponding image types in the easy-to-classify data set and stored in the low-quality image data set.

In this way, the training sample set may be cleaned based on the image quality, thereby constructing a new training sample set.

In step 1320, it is determined whether each image data in the easy-to-classify data set is correctly classified. In the case of a correct classification, step 1330 is performed; in the case of an incorrect classification, step 1340 is performed.

In step 1330, the image data in the low-quality data set that is correctly classified is augmented to the training sample set. The image data in the high-quality image data set may also be augmented to the training sample set.

In step 1340, the corresponding image data is divided into the first data set. The first data set comprises image data in the easy-to-classify data set that belongs to the low-quality data set and is incorrectly classified, that is, the data that has been misclassified once.

In some embodiments, the obtained low-quality data set is pushed to the accuracy detection module for review. The accuracy detection module screens the image data that is incorrectly classified in the low-quality data set; determines the image data that is incorrectly classified as the data that has been misclassified once, and augments the image data that is correctly classified to the training sample set.

After the augmented training sample set is obtained, and the first data set and the second data set are divided, image classification may be performed by the remaining steps in FIG. 1.

In step 140, the neural network model is trained by the augmented training sample set so as to determine the image classification model.

Figure 3:
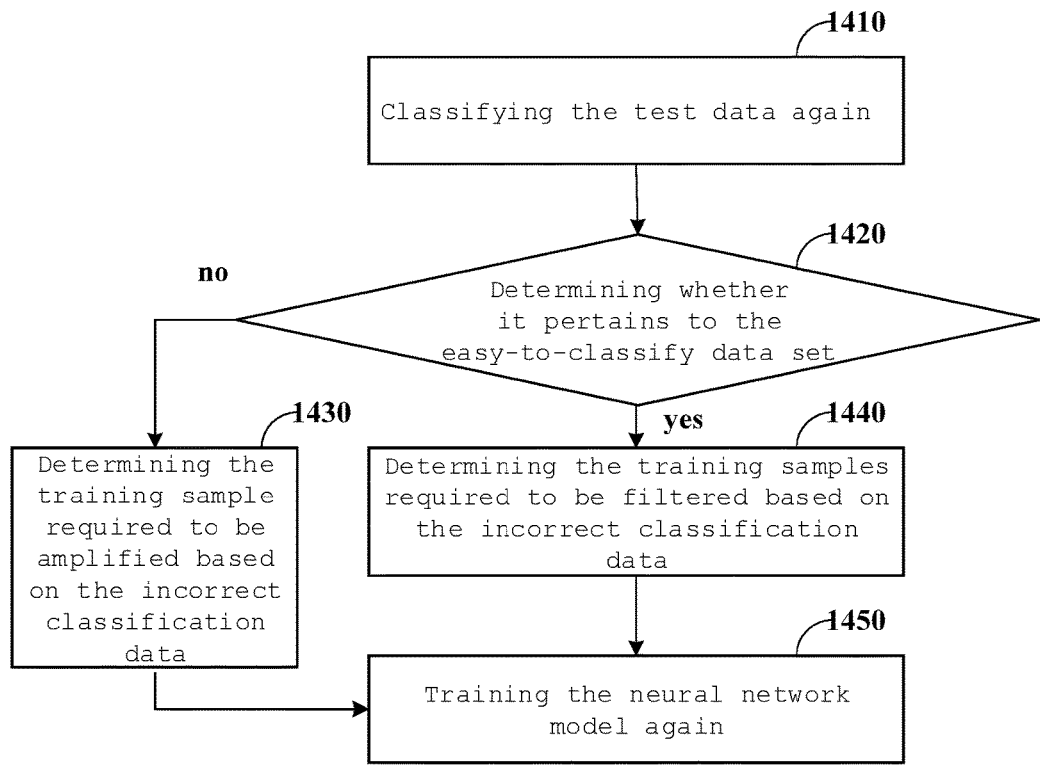
FIG. 3 shows a flowchart in some embodiments of step 140 in FIG. 1.

In some embodiments, step 140 may be implemented by the embodiment in FIG. 3.

FIG. 3 shows a flowchart in some embodiments of step 140 in FIG. 1.

As shown in FIG. 3, step 140 comprises: step 1410 of classifying the test data again; step 1420 of determining whether it pertains to the easy-to-classify data set; step 1430 of determining the training sample required to be augmented based on the incorrect classification data; step 1440 of determining the training samples required to be filtered based on the incorrect classification data; and step 1450 of training the neural network model again.

In step 1410, each test image data is input into the neural network model trained by the augmented training sample set for classification.

In some embodiments, the first data set and the second data set in each test image data are input into the trained neural network model for classification.

For example, the collective neural network model is updated by the augmented training sample set (for example, trained by the improved loss function). The first data set comprising the data that has been misclassified once and the second data set comprising the difficult-to-classify data are input into the updated neural network model for classification.

In some embodiments, in this classification process, the test data belonging to the easy-to-classify data set and having a classification accuracy rate greater than the second threshold is divided into the third data set. The test image data in the third data set is input into the trained neural network model for performing classification processing again. Based on whether the two classification results are consistent, it is determined whether the test image data in the third data set is correctly classified by the neural network model.

For example, in the case where the two classification results are consistent, it is determined that the classification is correct; the two classification results are inconsistent, and it is determined that the classification is incorrect. In this way, it is possible to quickly determine whether the marking result of the image data in the third data set marked by the neural network model is correct.

In step 1420, it is determined whether the test image data that is incorrectly classified this time belongs to the easy-to-classify data set. In the case where the test image data belongs to the easy-to-classify data set, step 1430 is performed; in the case where the test image data pertains to the easy-to-classify data set, step 1440 is performed.

In some embodiments, this classification result is pushed to the accuracy detection module for review to determine whether this classification result is correct; the image data that is incorrectly classified again is screened; the image data that is incorrectly classified again is collected as the data that has been misclassified twice.

In step 1430, the test image data that is incorrectly classified is derived from the difficult-to-classify data set, and the image type of the sample data that is required to be augmented again to augment the training sample set is determined based on the image type of the test image data that is incorrectly classified this time.

In some embodiments, if the data that has been misclassified twice belongs to the difficult-to-classify data set, it is indicated that the current neural network model cannot recognize these image data. These image data may belong to a new image type (for example, a new type of product defect or a product with a defect that is difficult to be recognized).

Based on these image data, it is possible to quickly understand the new and abnormal product defects in actual practices, and further collect the image data of similar types from the technical and service levels.

For example, from the technical level, the defect of this type may be simulated by the data enhancement technology to generate the image sample data of the corresponding image type for augmenting the training sample set.

For example, from the practical level, it is possible to focus on collecting the image data for the defect of this type in the production work, and further augment the training sample of this type.

In step 1440, the incorrectly marked samples required to be filtered in the augmented training sample set are determined based on the test image data that is incorrectly classified. For example, in this case, the test image data that is incorrectly classified belongs to the first data set, and the incorrectly marked samples required to be filtered may be determined based on the image type of the test data that is incorrectly classified.

In some embodiments, the data that has been misclassified twice is derived from the data that has been misclassified once, and these image data might be caused by the misclassified data (the samples that are incorrectly marked) in the original training sample set.

By these image data, it is possible to quickly understand the errors in the delayed sample set so as to perform processing by data cleaning.

In step 1450, the neural network model is trained again by using the augmented training sample set after processing so as to update the image classification model.

In some embodiments, the augmented training sample set after processing may be used to train other neural network models for image data classification.

In some embodiments, the classification accuracy of the neural network model trained again by using the augmented training sample set after processing is calculated. The steps in FIGS. 2 and 3 may be repeatedly performed until the classification accuracy rate is greater than the third threshold. In each repeated process, the parameters of the neural network model with the same network framework are updated.

In some embodiments, the augmented training sample set may be processed by at least one of the following processing methods: processing the augmented training sample set based on whether the test image data that is incorrectly classified belongs to the easy-to-classify data set; or augmenting the augmented training sample set again by using the test image data that is correctly classified this time.

For example, at least one of the following steps is repeated until the classification accuracy rate is greater than the third threshold: the test image data in the easy-to-classify data set that has a classification accuracy rate less than or equal to the second threshold and a correct classification result is used to augment the training sample; the training sample is processed based on whether the test image data that is incorrectly classified this time belongs to the easy-to-classify data set.

In some embodiments, each image data is input into the image classification model to determine the image type to which each image data belongs.

For example, each image data is input into an image classification model, and each image data is marked based on the classification result. In this way, it is possible to efficiently mark the image data, and locate the previous marking errors.

In the above-described embodiments, the augmented training sample set that has a larger scale and is more accurate is established. The neural network model trained again by the augmented training sample set has better classification capabilities for each image type. The reclassification result of the difficult-to-classify data and the data that has been misclassified once by the newly trained neural network model is more accurate, thereby reducing the workload of classification review.

In some embodiments, the determined data that has been misclassified twice contains certain product defects that are difficult to be recognized, and the problem data may be quickly located. Furthermore, this technical problem may be solved from the algorithmic level or the service level.

For example, from the algorithm level, it is possible to configure weights for the image type corresponding to the data that has been misclassified twice, so as to strengthen the weight of the loss value of this type during model training; and it is possible to perform data enhancement (for example, flip, translation, splicing, and the like) operations on the image data of this image type) operations so as to increase the data amount of the training sample for this image type.

For example, from the service level, the determination of whether the image type (for example, the product defect type) corresponding to the data that has been misclassified twice may be ignored. If it cannot be ignored, it is possible to focus on collecting the sample data of the image type to increase the data amount of the training sample of the image type in the training sample set.

Figure 4:
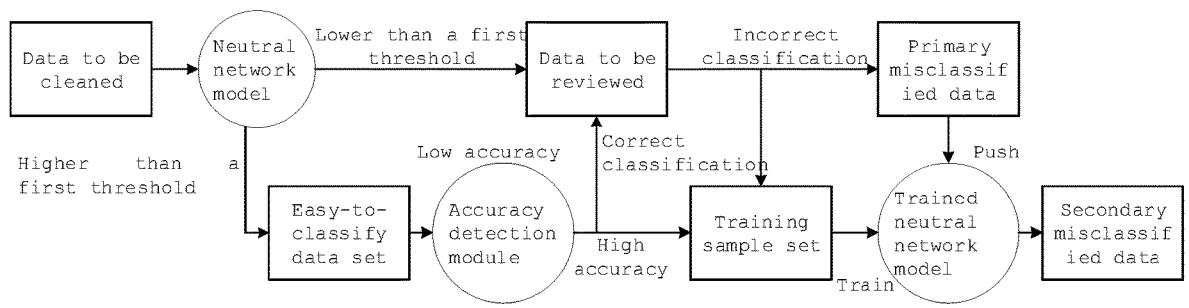
FIG. 4 shows a schematic view in some embodiments of the image data classification method according to the present disclosure.

FIG. 4 shows a schematic view in some embodiments of the image data classification method according to the present disclosure.

As shown in FIG. 4, the marked small scale original training sample set is input into the neural network model (for example, the VGG 16 convolutional neural model) as the data to be cleaned. Based on whether the membership probability of the classification result obtained by the neural network model is higher than the first threshold, the easy-to-classify data set and the difficult-to-classify data set are divided.

In some embodiments, the accuracy rate detection module may be used to calculate the accuracy rate of each image type in the easy-to-classify data set by random sampling. The low-accuracy data and the difficult-to-classify data set are determined as the data to be reviewed; and the high-accuracy data is augmented to the original training sample set.

By review processing of the classification accuracy, the image data that is incorrectly classified is screened out from the low-accuracy data. The image data that is correctly classified is augmented to the original training sample set; the image data that is incorrectly classified is determined as the data that has been misclassified once.

The augmented training sample set is used to train the neural network model, and the updated neural network model is used to classify the data that has been misclassified once and the difficult-to classify data again. The data that has been misclassified twice is obtained, and the cause of the classification error is analyzed based on the source of the data that has been misclassified twice, so as to clean the image data.

In some embodiments, the neural network model is Visual Geometry Group Network model.

In some embodiments, the original training sample set is obtained by capturing product images during production process.

In some embodiments, the classification accuracy rate is a classification accuracy rate of an image type in the easy-to-classify.

In the above-described embodiments, the workload in classification review of the image data is reduced, and the cleaning speed of the image data is accelerated. Moreover, the problems present in the data set are rapidly located, and the research and development progress of artificial intelligence projects is accelerated. It is possible to quantify the classification accuracy of the data set, and effectively improve the classification accuracy of the data set whilst, so that subsequent intelligent algorithms have more accurate and stable performance in actual scenarios.

Figure 5:
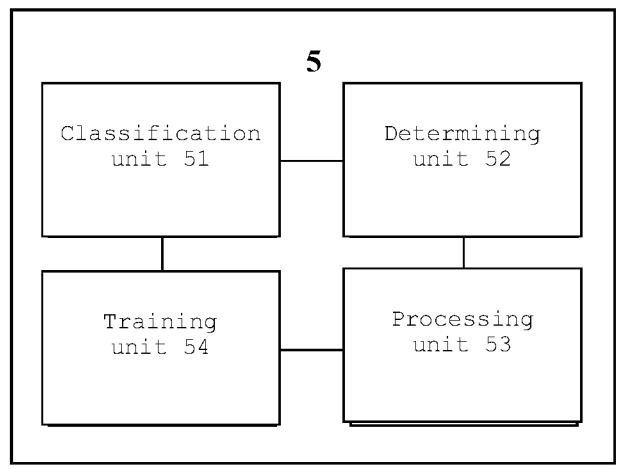
FIG. 5 shows a block diagram in some embodiments of the image data classification device according to the present disclosure.

FIG. 5 shows a block diagram in some embodiments of the image data classification device according to the present disclosure.

As shown in FIG. 5, the classification device 5 of the image data comprises a classification unit 51, a determining unit 52, a processing unit 53 and a training unit 54.

The classification unit 51 inputs each image data into the neural network model for classification, and determines the image type to which each image data pertains and the membership probability.

The determining unit 52 divides the test image data with the membership probability greater than the first threshold into the easy-to-categorize data set.

The processing unit 53 adds the test image data in the easy-to-classify data set that has a classification accuracy rate less than or equal to the second threshold and a correct classification result into the training sample set to generate an augmented training sample set.

The training unit 54 uses the augmented training sample set to train the neural network model so as to determine the image classification model.

In some embodiments, the processing unit 53 adds the test image data with a classification accuracy rate greater than the second threshold in the easy-to-classify data set to the training sample set so as to generate an augmented training sample set.

In some embodiments, the classification unit 51 inputs each test image data into the neural network model trained by the augmented training sample set for classification; the processing unit 53 processes the augmented training sample set based on whether the test image data that is incorrectly classified this time pertains to the easy-to-classify data set. The training sample set is augmented for processing; the training unit 54 uses the augmented training sample set after processing to train the neural network model again so as to update the image classification model.

In some embodiments, the processing unit 53 uses the test image data that is correctly classified this time to augment the augmented training sample set again for training the neural network model again.

In some embodiments, the classification unit 51 inputs the first data set and the second data set in each test image data into the trained neural network model for classification. The first data set comprises test image data in the easy-to-classify data set that has a classification accuracy rate less than or equal to the second threshold and an incorrect classification result. The second data set comprises test image data pertaining to the difficult-to-classify data set. The difficult-to-classify data set is determined based on the image type to which the test image data with the membership probability less than or equal to the first threshold pertains.

In some embodiments, in the case where the test image data that is incorrectly classified pertains to the first data set, the processing unit 53 determines the incorrectly marked samples required to be filtered in the augmented training sample set based on the test image data that is incorrectly classified.

In some embodiments, in the case where the test image data that is incorrectly classified pertains to the difficult-to-classify data set, the processing unit 53 obtains the sample data of the corresponding image type based on the image type of the test image data that is incorrectly classified this time; the processing unit 53 augments the augmented training sample set again. The difficult-to-classify data set is determined based on the image type to which the test image data with the membership probability less than or equal to the first threshold pertains.

In some embodiments, the processing unit 53 performs data enhancement processing on the test image data that is incorrectly classified this time to obtain the sample data of the corresponding image type; the processing unit 53 augments the augmented training sample set again.

In some embodiments, the processing unit 53 calculates the classification accuracy rate of the neural network model trained again by using the augmented training sample set after processing. The processing unit 53 repeats at least one of the following steps until the classification accuracy rate is greater than the third threshold: the test image data in the easy-to-classify data set that has a classification accuracy rate less than or equal to the second threshold and a correct classification result is used to augment the training samples; or the training samples are processed based on whether the test image data that is incorrectly classified pertains to the easy-to-classify data set.

In some embodiments, the processing unit 53 uses the linear adjustment factor and the exponential adjustment factor provided for the membership probability to process the focus loss function with the membership probability as a variable and determines the improved loss function for training the neural network model.

The linear adjustment factor and the exponential adjustment factor are configured such that: in the case where any membership probability is less than the membership probability of the intersection point of the focal loss function and the improved loss function, the value of the improved loss function corresponding to the membership probability is greater than that of the focal loss function; in the case where any membership probability is greater than that of the intersection point, the value of the improved loss function corresponding to the membership probability is less than that of the focal loss function.

In some embodiments, the improved loss function is determined according to $(1-\hat{y}+\varepsilon)^\gamma$, where $\hat{y}$ is the membership probability, $\varepsilon$ is the linear adjustment factor, and $\gamma$ is the exponential adjustment factor.

In some embodiments, the classification unit 51 inputs each image data into the image classification model to determine the image type to which each image data pertains.

In some embodiments, each image data is the production line image data of the production industry, and the image type is the product defect type in the production line image data.

In some embodiments, the classification unit 51 inputs each image data into an image classification model, and the processing unit marks each image data based on the classification result.

Figure 6:
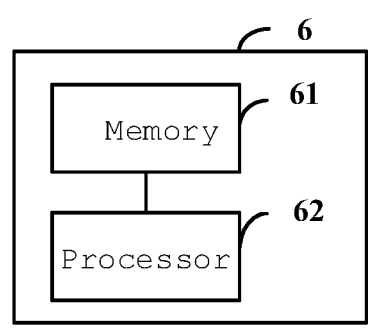
FIG. 6 shows a block diagram of other embodiments of the image data classification device according to the present disclosure.

FIG. 6 shows a block diagram of other embodiments of the image data classification device according to the present disclosure.

As shown in FIG. 6, the image data classification device 6 in this embodiment comprises a memory 61, and a processor 62 coupled to the memory 61, wherein the processor 62 is configured to implement the image data classification method according to any one of the embodiments of the present disclosure based on the instructions stored in the memory 61.

Wherein, the memory 61 may comprise, for example, a system memory, a fixed non-volatile storage medium, and the like. The system memory is stored with, for example, an operating system, an application program, a boot loader, a database, and other programs.

Figure 7:
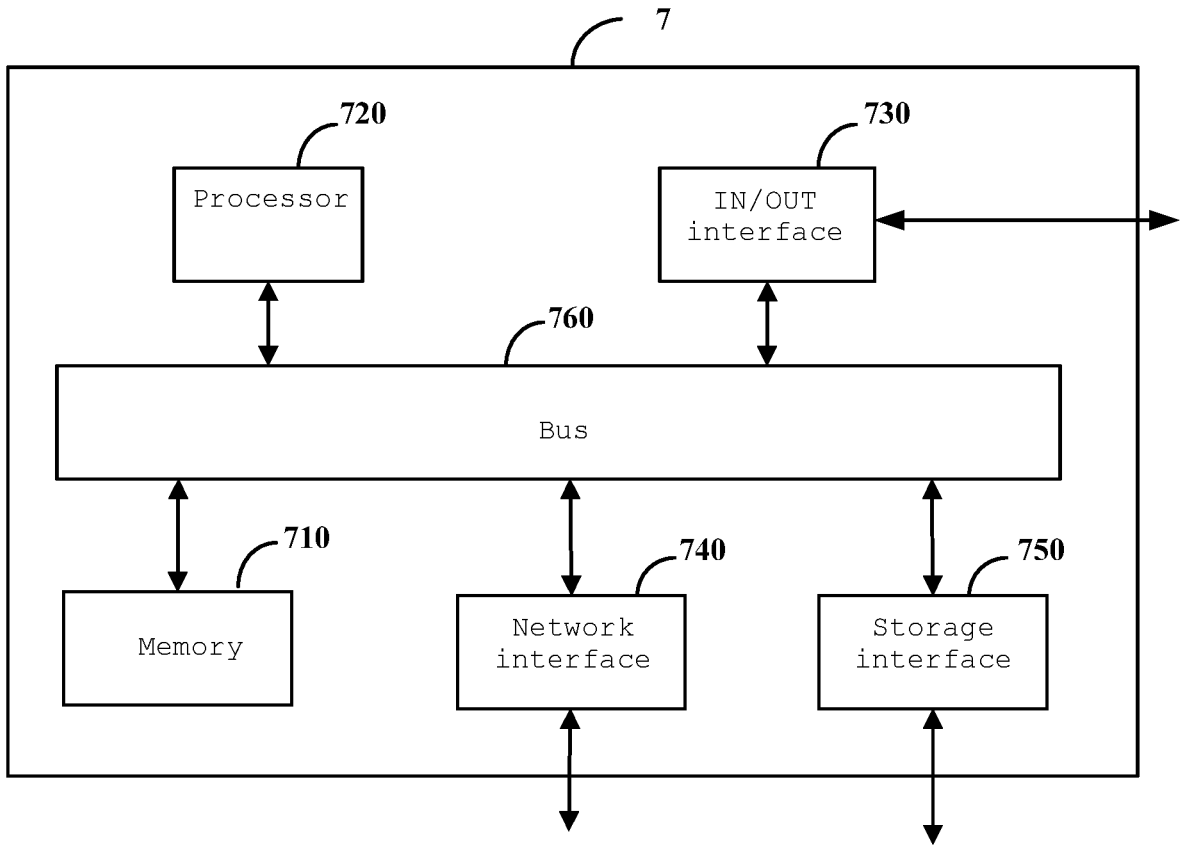
FIG. 7 shows a block diagram in still other embodiments of the image data classification device according to the present disclosure.

FIG. 7 shows a block diagram in still other embodiments of the image data classification device according to the present disclosure.

As shown in FIG. 7, the image data classification device 7 in this embodiment comprises a memory 710, and a processor 720 coupled to the memory 710, wherein the processor 720 is configured to implement the image data classification method according to any one of the embodiments of the present disclosure based on the instructions stored in the memory 710.

Wherein, the memory 710 may comprise, for example, a system memory, a fixed non-volatile storage medium, and the like. The system memory is stored with, for example, an operating system, an application program, a boot loader, a database, and other programs.

The image data classification device 7 may also comprise an IN/OUT interface 730, a network interface 740, a storage interface 750, and the like. These interfaces 730, 740, 750, and the memory 710 and the processor 720 may be connected therebetween by a bus 760, for example. Wherein, the IN/OUT interface 730 provides a connection interface for input and output devices such as a display, a mouse, a keyboard, a touch screen, a microphone, and a speaker. The network interface 740 provides a connection interface for various networked devices. The storage interface 750 provides a connection interface for external storage devices such as SD card and U disk.

Figure 8:
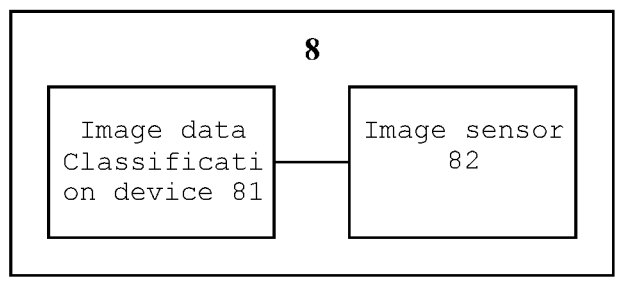
FIG. 8 shows a block diagram in some embodiments of the image data classification system of the present disclosure.

FIG. 8 shows a block diagram in some embodiments of the image data classification system of the present disclosure.

As shown in FIG. 8, the image data classification system comprises: an image data classification device 81 according to any one of the above-described embodiments; and an image sensor 82 for obtaining the image data. The classification device 81 is a hardware device such as a hardware processor or a hardware server that executes the image data classification method in any of the above embodiments.

Those skilled in the art will appreciate that the embodiments of the present disclosure may be provided as a method, system, or computer program product. Accordingly, the present disclosure may take the form of an entirely hardware embodiment, an entirely software embodiment, or a combination of software and hardware aspects. Moreover, the present disclosure may take the form of a computer program product embodied in one or more computer-usable non-transitory storage media (comprising but not limited to disk memory, CD-ROM, optical memory, and the like) comprising computer usable program codes therein.

So far, the image data classification method, the image data classification device, the image data classification system, and the non-volatile computer-readable storage medium according to the present disclosure have been described in detail. Some details well known in the art are not described in order to avoid obscuring the concept of the present disclosure.

According to the above description, those skilled in the art would fully understand how to implement the technical solutions disclosed here.

The method and system of the present disclosure may be implemented in many manners. For example, the method and system of the present disclosure may be implemented by software, hardware, firmware, or any combination of software, hardware, and firmware. The above-described sequence for the steps of the method is merely for illustrative purposes, and the steps of the method according to the present disclosure are not limited to the sequence specifically described above unless otherwise specified. Moreover, in some embodiments, the present disclosure may also be embodied as programs recorded in a recording medium, which comprise machine readable instructions for implementing the method according to the present disclosure. Thus, the present disclosure also covers a recording medium that stores programs for performing the method according to the present disclosure.

Although some specific embodiments of the present disclosure have been described in detail by way of examples, those skilled in the art should understand that the above examples are only for the purpose of illustration and are not intended to limit the scope of the present disclosure. It should be understood by those skilled in the art that modifications to the above embodiments may be made without departing from the scope and spirit of the present disclosure. The scope of the present disclosure is defined by the appended claims.

What is claimed is:

1. An image data classification method, comprising:
inputting test image data into a neural network model trained by using an original training sample set for classification, wherein the test image data is different from a training sample in the original training sample set, and determining an image type to which the test image data belongs and a membership probability of the image data belonging to the image type;
establishing a first classified data set, according to test image data with a membership probability greater than a first threshold;
adding test image data in the first classified data set that has a classification accuracy rate less than or equal to a second threshold and a correct classification result to the original training sample set to generate an augmented training sample set;
determining an image classification model by using the augmented training sample set to train the neural network model; and
using a linear adjustment factor and an exponential adjustment factor provided for a membership probability to process a focal loss function with the membership probability as a variable, and determining an improved loss function to train the neural network model, wherein the linear adjustment factor and the exponential adjustment factor are configured such that value of the improved loss function corresponding to the membership probability is greater than that of the focal loss function in a case where any membership probability is less than a membership probability of the intersection point of the focal loss function and the improved loss function, and the value of the improved loss function corresponding to the membership probability is less than that of the focal loss function in a case where any membership probability is greater than a membership probability of the intersection point.

2. The image data classification method according to claim 1, further comprising:
adding test image data with a classification accuracy rate greater than the second threshold in the first classified data set to the training sample set so as to generate the augmented training sample set.

3. The image data classification method according to claim 1, further comprising:
inputting the test image data into the neural network model trained by the augmented training sample set for classification;
processing the augmented training sample set based on whether test image data that is incorrectly classified this time pertains to the first classified data set; and
updating the image classification model by using the augmented training sample set after processing to train the neural network model again.

4. The image data classification method according to claim 3, further comprising:
using test image data that is correctly classified this time to augment the augmented training sample set again so as to train the neural network model again.

5. The image data classification method according to claim 3, wherein the inputting the test image data into the neural network model trained by the augmented training sample set for classification comprises:
inputting a first data set and a second data set of the test image data into the neural network model trained by the augmented training sample set for classification, wherein the first data set comprises test image data in the first classified data set that has a classification accuracy rate less than or equal to the second threshold and an incorrect classification result, and the second data set comprises test image data in a second classified data set, wherein the second classified data set is determined based on an image type to which test image data with a membership probability less than or equal to the first threshold belongs.

6. The image data classification method according to claim 5, wherein the processing the augmented training sample set based on whether test image data that is incorrectly classified this time pertains to the first classified data set comprises:
  determining an incorrectly marked samples required to be filtered in the augmented training sample set based on the test image data that is incorrectly classified in a case that the test image data that is incorrectly classified belongs to the first data set.

7. The image data classification method according to claim 3, wherein the processing the augmented training sample set based on whether test image data that is incorrectly classified this time pertains to the first classified data set comprises:
  obtaining sample data of an image type of the test image data that is incorrectly classified this time to augment the augmented training sample set again, in the case where the test image data that is incorrectly classified pertains to a second classified data set, wherein the second classified data set is determined based on an image type to which test image data with a membership probability less than or equal to the first threshold belongs.

8. The image data classification method according to claim 7, wherein the obtaining sample data of an image type of the test image data that is incorrectly classified this time to augment the augmented training sample set again comprises:
  performing data enhancement processing on the test image data that is incorrectly classified this time, obtaining the sample data of the image type of the test image data that is incorrectly classified this time, and augmenting the augmented training sample set again.

9. The image data classification method according to claim 3, further comprising:
  calculating a classification accuracy rate of the neural network model trained again by using the augmented training sample set after processing;
  repeating at least one of the following steps until the classification accuracy rate of the neural network model is greater than a third threshold in a case where the classification accuracy rate of the neural network model is less than or equal to the third threshold:
  augmenting test image data in the first classified data set that has a classification accuracy less than or equal to the second threshold and a correct classification result to the training sample set, and training the neural network model by using the training sample set augmented; or
  processing the training sample set based on whether the test image data that is incorrectly classified this time belongs to the first classified data set and training the neural network model using the processed training sample set.

10. The image data classification method according to claim 1, wherein, the improved loss function is determined according to $(1-\hat{y}+\varepsilon)^{\gamma}$, wherein $\hat{y}$ is the membership probability, $\varepsilon$ is the linear adjustment factor, and $\gamma$ is the exponential adjustment factor.

11. The image data classification method according to claim 1, further comprising:
  inputting image data into the image classification model and determining an image type to which the test image data belongs.

12. The image data classification method according to claim 11, wherein the image data is production line image data of production industry, and the image type is a product defect type of the production line image data.

13. The image data classification method according to claim 1, further comprising:
  inputting image data into the image classification model and marking the image data based on a classification result.

14. The image data classification method according to claim 1, wherein the neural network model is Visual Geometry Group Network model.

15. The image data classification method according to claim 1, wherein the original training sample set is obtained by capturing product images during production process.

16. The image data classification method according to claim 1, wherein the classification accuracy rate is a classification accuracy rate of an image type in the first classified data set calculated by using multiple accuracy rate detection modules.

17. An image data classification device, comprising:
  a memory; and
  a processor coupled to the memory, wherein the processor is configured to implement the image data classification method according to claim 1 based on instructions stored in the memory.

18. An image data classification system, comprising:
  an image data classification device according to claim 17; and
  an image sensor for obtaining image data.

19. A non-volatile computer-readable storage medium having a computer program stored thereon, which when executed by a processor implements the image data classification method according to claim 1.

* * * * *